US012769622B2

(12) United States Patent
Hayasaka et al.

(10) Patent No.: US 12,769,622 B2
(45) Date of Patent: Oct. 20, 2026

(54) MANAGEMENT APPARATUS FOR STORAGE SYSTEM

(71) Applicant: Hitachi Vantara, Ltd., Yokohama (JP)

(72) Inventors: Mitsuo Hayasaka, Tokyo (JP); Masanori Takata, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 19/077,826

(22) Filed: Mar. 12, 2025

(65) Prior Publication Data

US 2026/0072793 A1 Mar. 12, 2026

(30) Foreign Application Priority Data

Sep. 6, 2024 (JP) ................................ 2024-153937

(51) Int. Cl.
*G06F 11/14* (2026.01)
*G06F 11/1446* (2026.01)

(52) U.S. Cl.
CPC ...... *G06F 11/1464* (2013.01); *G06F 11/1469* (2013.01)

(58) Field of Classification Search
CPC ... G06F 11/14; G06F 11/1464; G06F 11/1469
See application file for complete search history.

(56) References Cited

U.S. PATENT DOCUMENTS 9,268,799 B1 * 2/2016 Qi ........................ G06F 11/1469
11,442,819 B2 * 9/2022 Chopra ............... G06F 11/1448
2012/0134491 A1 * 5/2012 Liu ........................ H04L 9/0869 380/28
2021/0286683 A1 * 9/2021 Varma ................. G06F 11/1464
2022/0011938 A1 * 1/2022 Potnis ................... G06F 3/0619
2022/0229735 A1 * 7/2022 Chopra ............... G06F 11/1448
2023/0393948 A1 * 12/2023 Fujii ................... G06F 11/1469
2024/0020206 A1 * 1/2024 Arai ..................... G06F 11/1469
2024/0211357 A1 * 6/2024 Gunasekaran ........ G06F 16/128
2026/0093582 A1 * 4/2026 Zheng ................. G06F 11/1451

FOREIGN PATENT DOCUMENTS

JP 2023-179097 A 12/2023

* cited by examiner

*Primary Examiner* — Kamini B Patel
(74) *Attorney, Agent, or Firm* — PROCOPIO, CORY, HARGREAVES & SAVITCH LLP

(57) ABSTRACT

An apparatus that manages a storage system includes a processor, and a storage device that stores a backup management model. The backup management model includes information of a snapshot generation of a volume, which is stored in a restoration destination storage system, and information of a snapshot generation of the volume, which is stored in a cloud storage system. The processor is configured to select a restoration source of each of the snapshot generations to be used for restoration of a generation designated in the restoration destination storage system from the restoration destination storage system and the cloud storage system with reference to the backup management model.

20 Claims, 10 Drawing Sheets

FIG. 5

320

```
{
    “snapshot”: “snapshot information”,
    “snapshot_list”: [
        {
          “ssid”: 00,
          “backup_time”: 2024/01/10 12:00,
          “volume_size”: 10TB
        },
        {
          “ssid”: 01,
          “backup_time”: 2024/01/11 12:00,
          “volume_size”: 10TB
        },
        {
          “ssid”: 02,
          “backup_time”: 2024/01/12 12:00,
          “volume_size”: 10TB
        }
    ]
}
```

BACKUP CATALOG

MANAGEMENT APPARATUS FOR STORAGE SYSTEM

CLAIM OF PRIORITY

The present application claims priority from Japanese patent application JP 2024-153937 filed on Sep. 6, 2024, the content of which is hereby incorporated by reference into this application.

BACKGROUND OF THE INVENTION

1. Field of the Invention

The present invention relates to management of a storage system.

2. Description of the Related Art

As a background art of the present invention, there is JP 2023-179097 A. JP 2023-179097 A discloses a technique for reducing a data transfer amount in a case where restoration is executed from a cloud. According to the technique, obtaining a snapshot of a logical volume includes: generating catalog information of each snapshot including at least a storage location of actual data of the snapshot and a reference destination for specifying another snapshot having a parent-child relationship with the snapshot; and storing the actual data of the snapshot in a physical storage device and/or a cloud service. In a case where any of a plurality of snapshots is designated and restored, the storage location of the actual data is specified with reference to the catalog information to acquire the actual data saved in the physical storage device, and the actual data which is not saved in the physical storage device is acquired from the cloud service (for example, see a summary).

SUMMARY OF THE INVENTION

For example, in a hybrid cloud system including an on-premises storage system and a cloud storage system, a technique capable of efficiently executing restoration of a volume to any base is desired.

According to an aspect of the present invention, an apparatus that manages a storage system includes a processor, and a storage device that stores a backup management model. The backup management model includes information of a snapshot generation of a volume, which is stored in a restoration destination storage system, and information of a snapshot generation of the volume, which is stored in a cloud storage system. The processor is configured to select a restoration source of each of the snapshot generations to be used for restoration of a generation designated in the restoration destination storage system from the restoration destination storage system and the cloud storage system with reference to the backup management model.

According to the aspect of the present invention, it is possible to improve the efficiency in restoration of a volume.

BRIEF DESCRIPTION OF THE DRAWINGS

FIG. 5 illustrates an example of a backup catalog of a volume A;

DESCRIPTION OF THE PREFERRED EMBODIMENTS

Hereinafter, an embodiment of the present invention will be described with reference to the drawings. The present invention is not construed as being limited to the descriptions of the embodiment as follows. Those skilled in the related art can easily understand that the specific configuration may be changed in a range without departing from the concept or the spirit of the present invention.

In this specification and the like, the notations "first", "second", "third", and the like are used for identifying the constituent elements, and the number or order is not necessarily limited. In the configuration of the invention described below, the same or similar components or functions are denoted by the same reference signs, and repetitive descriptions will be omitted.

In addition, in the following description, in a case where the same type of elements are described without being distinguished, a common reference sign (or a reference sign) may be used in the reference signs, and in a case where the same type of elements are described with being distinguished, a reference sign (or an element ID) may be used.

Since a program is executed by a processor (for example, a central processing unit (CPU)) included in a storage controller in a storage device to appropriately execute predetermined processing by using a storage resource (for example, a memory) and/or a communication interface device (for example, a host I/F), a subject of the processing may be the storage device or the processor. In addition, the storage controller may include a hardware circuit that executes a part or the entirety of the processing. A computer program may be installed from a program source. The program source may be, for example, a program distribution server or a computer-readable storage medium.

Figure 1:
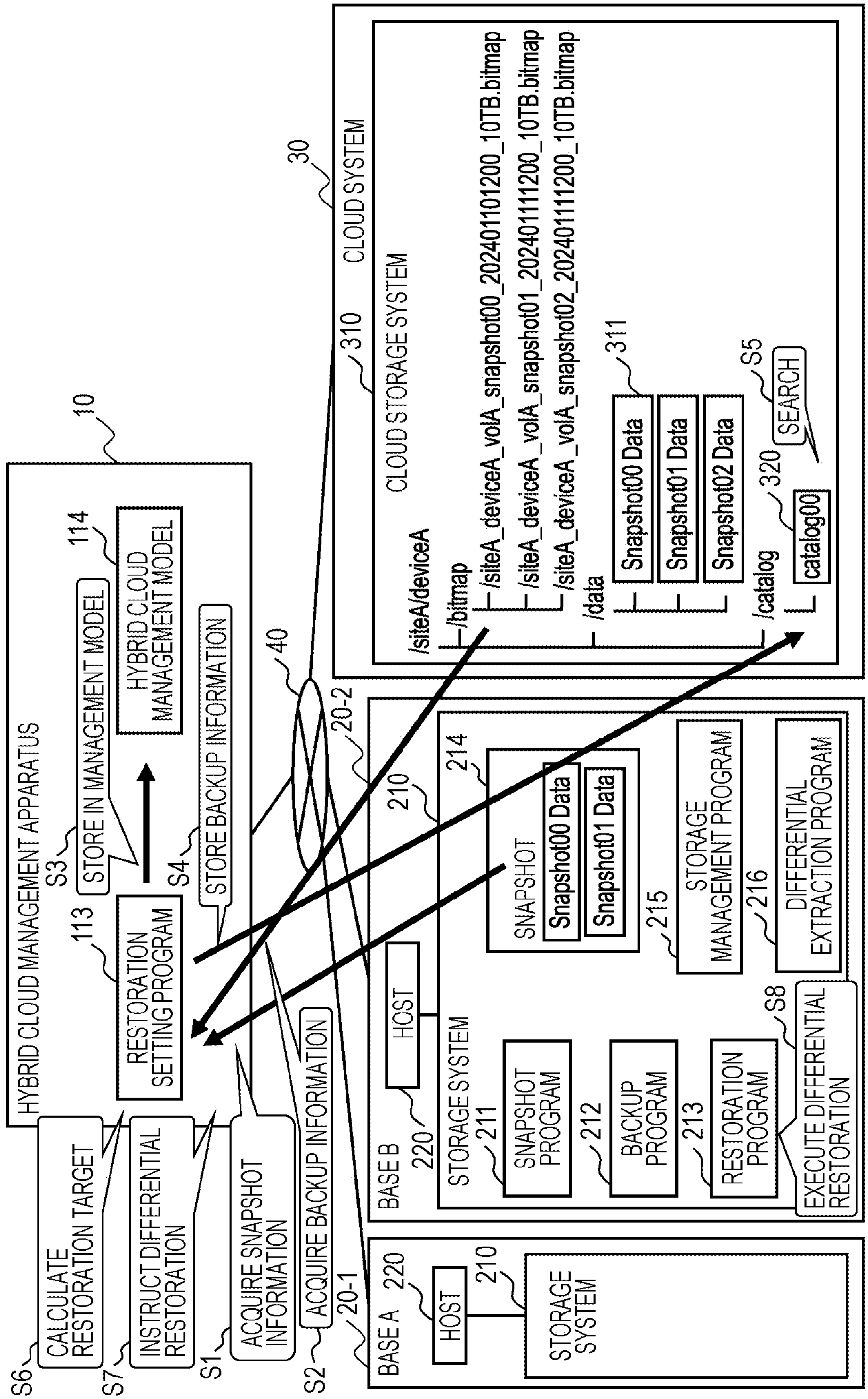
FIG. 1 schematically illustrates an example of a configuration of a computer system according to an embodiment of the present specification.

FIG. 1 schematically illustrates an example of a configuration of a computer system according to an embodiment of the present specification. The computer system includes devices disposed in different bases. Specifically, one or more host devices 220 and one or more storage systems 210 are installed in a base A (20-1) and a base B (20-2), which are different from each other. The storage system 210 is a so-called on-premises storage system.

FIG. 1 illustrates one host device 220 and one storage system 210 in each base, but the number thereof is freely set. In each base, the host device 220 accesses the storage system 210 to write and read host data.

The computer system further includes a cloud system 30 installed in a base different from the base A (20-1) and the base B (20-2). The cloud system 30 includes a cloud storage system 310 and provides a cloud storage service.

The computer system further includes a hybrid cloud management apparatus 10. The hybrid cloud management apparatus 10 manages the storage system 210 of the base A (20-1) and the base B (20-2) and the cloud storage system 310, and the hybrid cloud management apparatus 10, the base A (20-1), the base B (20-2), and the cloud system 30 can communicate via a network 40. The hybrid cloud management apparatus 10 may be disposed in any base and may be included in the cloud system 30, for example.

The storage system 210 includes one or more controllers and one or more physical storage devices (also referred to as storage drives) (not illustrated), and processes an IO request (read request or write request) from the host device 220. The storage device provides a physical storage area for storing host data from the host device 220.

The controller includes a front-end interface, a processor (main processor), a memory, and a back-end interface. The front-end interface is a communication interface with the host device 220, and the back-end interface is a communication interface with the storage device. The controller applies a logical volume for storing host data to the host device 220, and a storage area (address) of the logical volume is mapped to a physical storage area of one or more storage devices.

The storage system 210 executes a plurality of programs. Each program may be executed by a main processor of the controller or a processor included in another device (for example, a front-end interface). In the example of the configuration illustrated in FIG. 1, the storage system 210 executes a snapshot program 211, a backup program 212, a restoration program 213, a storage management program 215, and a differential extraction program 216.

FIG. 1 illustrates an internal configuration of the storage system 210 in the base B (20-2), and the storage system 210 in the base A (20-1) has a similar configuration. The storage management program 215 executes volume generation and management, host IO processing, and overall management and control of the storage system 210.

The storage system 210 stores a snapshot group 214 of each designated volume. For example, a snapshot of a first generation stores all pieces of data of the volume, and each subsequent snapshot stores differential data from a snapshot of the previous generation. The snapshot program 211 creates a snapshot of the designated volume.

The backup program 212 transmits the backup of the designated volume to the cloud storage system 310. In this example, the backup program 212 transmits a copy of the snapshot group 214 to the cloud storage system 310, and the cloud storage system 310 stores the data.

In FIG. 1, snapshot data (such as Snapshot1 Data 311) stored in the cloud storage system 310 is a copy of a snapshot generated by the storage system 210 in the base A (20-1). A part of the snapshot in the base A (20-1) is copied from the cloud storage system 310 to the snapshot group 214 in the base B (20-2). The snapshot group 214 in the base B (20-2) can be used for data analysis, for example.

The differential extraction program 216 generates a bitmap indicating a difference between any generations of snapshots. In the bitmap, for example, "0" is assigned to an address of the same data, and "1" is assigned to an address of different data. The bitmap is stored in the cloud storage system 310 together with snapshot data.

The hybrid cloud management apparatus 10 executes a restoration setting program 113. The restoration setting program 113 manages restoration of a volume. In the example of FIG. 1, in a case where a failure has occurred in the storage system 210 of the base A (20-1) or in a case where data of the base A (20-2) is acquired and analyzed in the base B (20-1), the storage system 210 in the base B (20-2) executes restoration of the volume of the base A (20-1).

An outline of processing of the restoration setting program 113 will be described. The restoration setting program 113 acquires snapshot information from the storage system 210 in the base B (20-2) (S1). The snapshot information indicates, for example, a generation of a snapshot of each volume retained by the storage system 210 of the base B (20-2).

The restoration setting program 113 acquires backup information from the cloud storage system 310 (S2). The backup information indicates, for example, a file name of a bitmap of each volume retained by the cloud storage system 310.

The restoration setting program 113 stores the acquired snapshot information and backup information in a hybrid cloud management model 114 (S3). The hybrid cloud management model 114 includes information of storage systems of the respective bases, volumes retained by the storage systems, and storage locations of snapshots of the respective volumes. A format of the hybrid cloud management model 114 is freely set.

The restoration setting program 113 converts the backup information acquired from the cloud storage system 310 into a backup catalog 320 in a format that can be used for search in the cloud storage system 310, for example, JSON or CSV, and stores the backup information in the cloud storage system 310 (S4). The backup catalog 320 is a target of a search request from a user (S5).

In a case where a request for restoring the volume of the base A (20-1) in the base B (20-2) is received from the user, the restoration setting program 113 calculates a restoration target (S6). The restoration setting program 113 refers to the hybrid cloud management model 114 and identifies the snapshot of the restoration target volume retained by the storage system 210 of the base B (B-1). The restoration setting program 113 specifies a designated snapshot of an insufficient generation for the restoration.

The restoration setting program 113 transmits an instruction to execute differential restoration to the storage system 210 in the base B (20-2) together with information of a snapshot of an insufficient generation (for example, "Snapshot02 Data") (S7).

In response to an instruction from the restoration setting program 113, the restoration program 213 of the storage system 210 acquires a snapshot of an insufficient generation from the cloud storage system 310, and restores the target volume by using a combination with the snapshot retained in the apparatus itself (S8).

Figure 2:
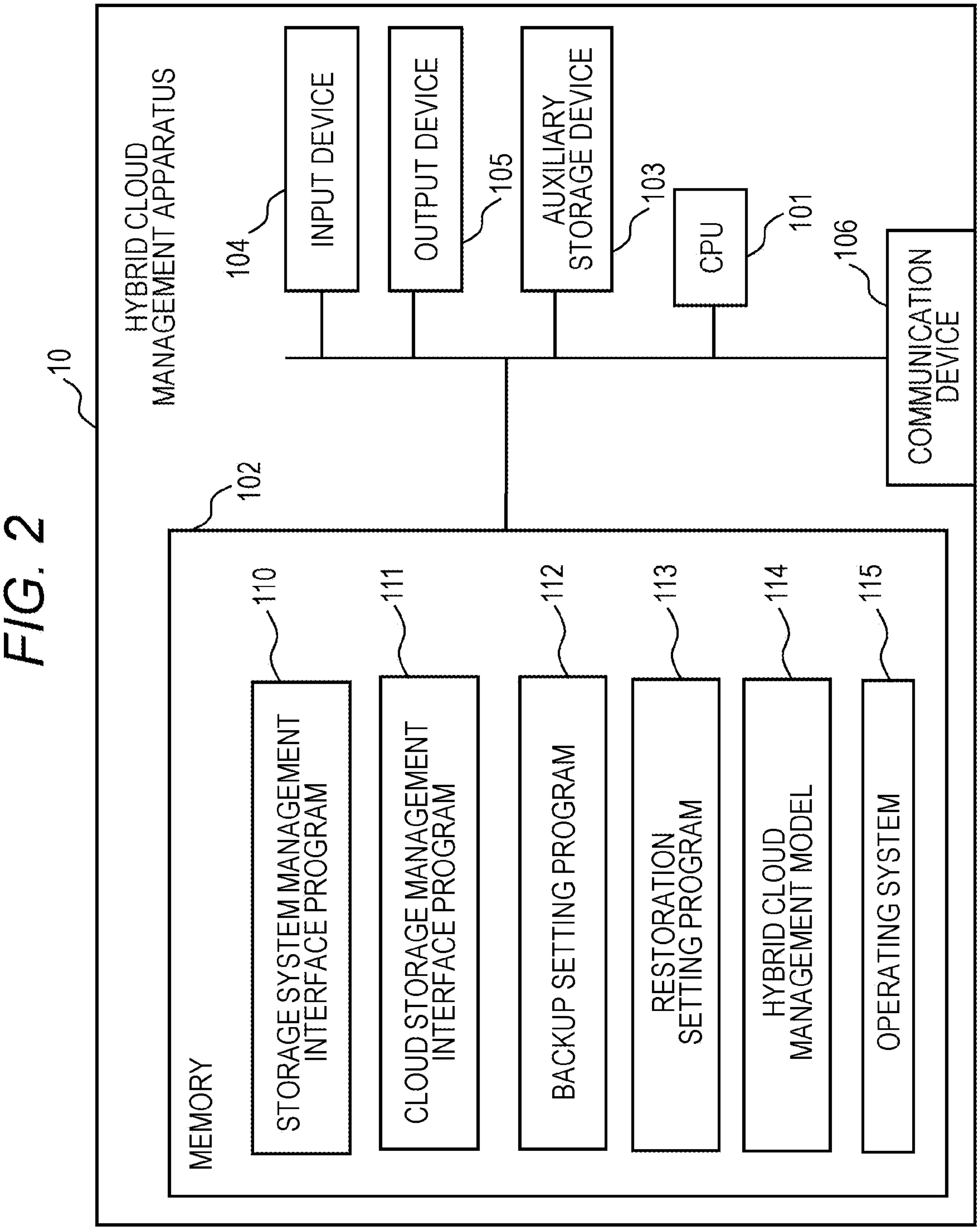
FIG. 2 illustrates an example of a configuration of a hybrid cloud management apparatus.

FIG. 2 illustrates an example of a configuration of the hybrid cloud management apparatus 10. The hybrid cloud management apparatus 10 includes a CPU 101 that is a processor that executes various programs, a memory 102 that is a primary storage device that stores various programs, and an auxiliary storage device 103 that stores various types of data. The CPU 101 may include one or more cores, and the memory 102 is, for example, a DRAM including a volatile storage area. The auxiliary storage device 103 is, for example, a hard disk drive (HDD), a flash memory, or the like, and can provide a non-volatile storage area.

The hybrid cloud management apparatus 10 further includes an output device 105 that presents information to a user of the apparatus, an input device 104 that inputs an instruction, an image, or the like by the user, and a communication device 106 that communicates with another device. The components of the hybrid cloud management apparatus 10 are connected to each other by a bus. The user may use a terminal connected to the hybrid cloud management apparatus 10 via a network instead of the input/output device of the hybrid cloud management apparatus 10.

The functional units of the hybrid cloud management apparatus 10 can be implemented, for example, by the CPU 101 operating in accordance with a program. The CPU 101 reads and executes various programs from the memory 102 as necessary. The memory 102 can store programs and data used by the programs. Each program and reference data are loaded from the auxiliary storage device 103 to the memory 102, for example, and are executed and processed by the CPU 101. At least a part of the functional unit may be configured by a logic circuit.

The output device 105 may include a device such as a display, a printer, or a speaker. The input device 104 may include a device such as a keyboard, a mouse, or a microphone. The output device 105 presents an input result from the user and presents a processing result by the hybrid cloud management apparatus 10. An instruction from the user is input to the hybrid cloud management apparatus 10 by the input device 104. In a case where another terminal is used, the input/output device functions similarly, and the output device 105 and the input device 104 can be omitted.

For example, the communication device 106 receives data transmitted from another device connected via a network, and transmits a processing result by the hybrid cloud management apparatus 10 to another device. Some devices may be omitted.

In the example of the configuration illustrated in FIG. 2, the memory 102 stores a storage system management interface program 110, a cloud storage management interface program 111, a backup setting program 112, a restoration setting program 113, a hybrid cloud management model 114, and an operating system 115.

The storage system management interface program 110 is a communication interface with the storage system 210. The cloud storage management interface program 11 is a communication interface with the cloud storage system 310. A backup target and a schedule by the user are acquired and managed, and an instruction indicating the backup target and the schedule is transmitted to the storage system 210 and the cloud storage system 310.

Figure 3:
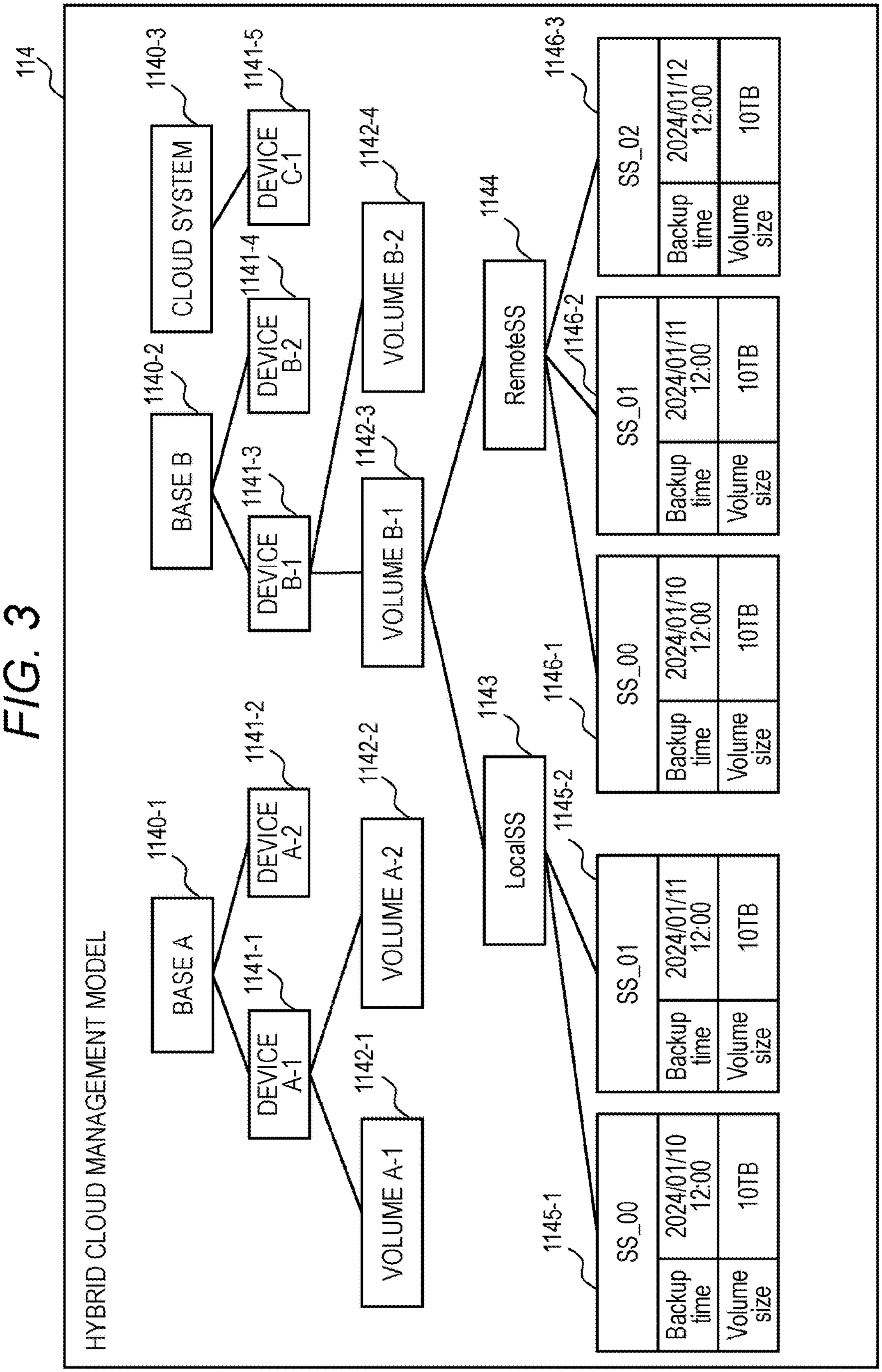
FIG. 3 illustrates an example of a configuration of a hybrid cloud management model.

FIG. 3 illustrates an example of a configuration of the hybrid cloud management model 114. As illustrated in FIG. 3, the hybrid cloud management model 114 indicates information of a storage system (device) of each base and the cloud system, a volume retained by the storage system, and a snapshot of the volume. The information of the snapshot includes the time of the snapshot and information of the device storing the snapshot.

In the example illustrated in FIG. 3, a device A-1 (1141-1) and a device A-2 (1141-2) are installed in the base A (1140-1). The device means a storage system. Further, the device A-1 (1141-1) stores a volume A-1 (1142-1) and a volume A-2 (1142-2).

A device B-1 (1141-3) and a device B-2 (1141-4) are installed in the base B (1140-2). Further, the device B-1 (1141-3) stores a volume B-1 (1142-3) and a volume B-2 (1142-4). The volume B-1 (1142-3) is a volume obtained by restoring the volume A-1 (1142-1). The volume B-2 (1142-4) is a volume obtained by restoring the volume A-2 (1142-2).

LocalSS 1143 indicates a snapshot of the volume B-1 (1142-3) stored in the device B-1 (1141-3). These are snapshot SS_00 (1145-1) and snapshot SS_01 (1145-2).

RemoteSS 1144 indicates a snapshot of the volume B-1 (1142-3) stored in the cloud system 1140-3. These are snapshot SS_00 (1146-1), snapshot SS_01 (1146-2), and snapshot SS_02 (1146-3).

In the example of FIG. 3, the information of each snapshot indicates information of the generation time and the size of a target volume. In the example of FIG. 3, snapshot SS_02 exists only in the cloud system 1140-3. The cloud system 1140-3 includes a device C-1 (1141-5) which is the cloud storage system 310.

Figure 4:
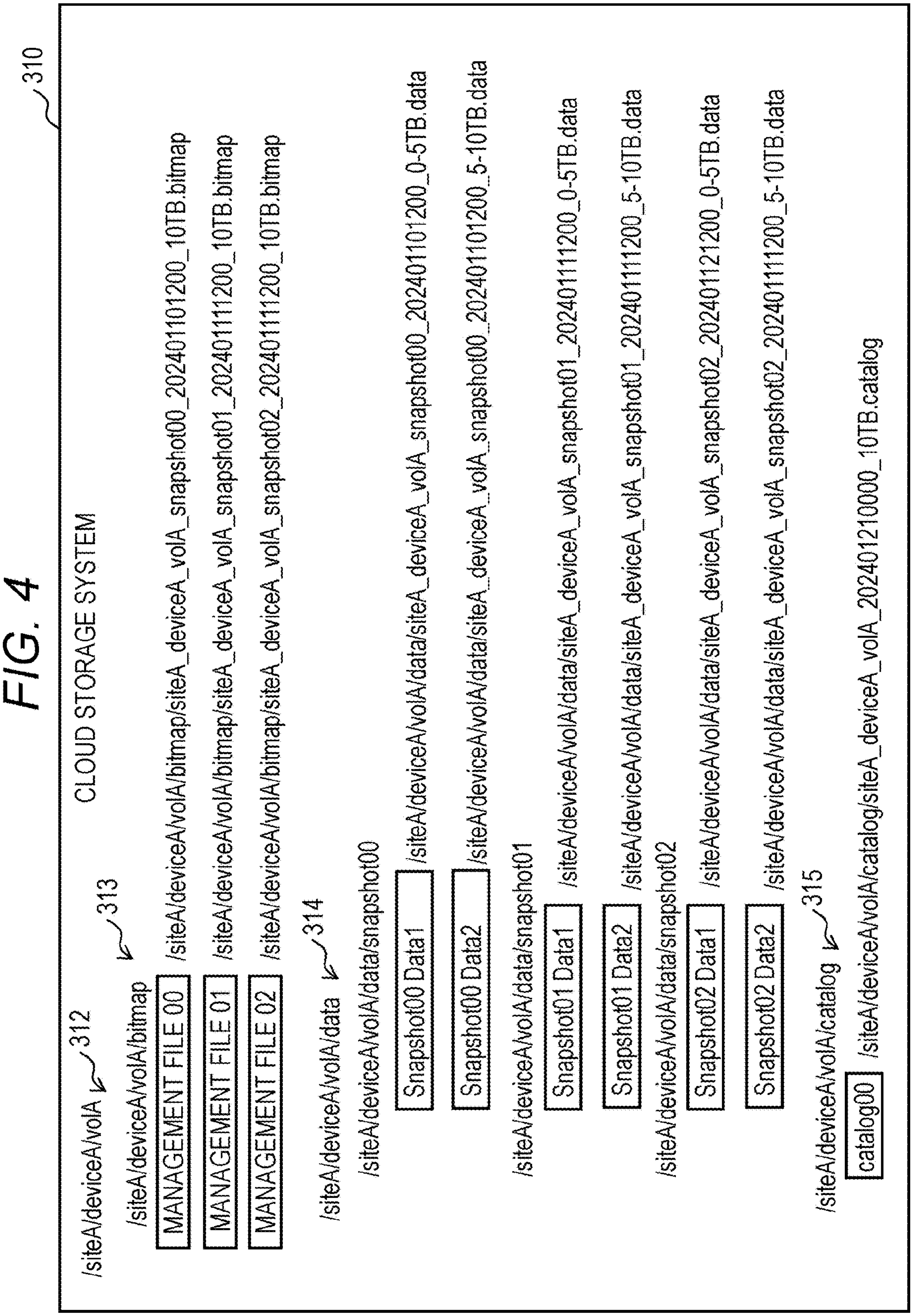
FIG. 4 illustrates a directory structure of data stored in a cloud storage system.

FIG. 4 illustrates a directory structure of data stored in the cloud storage system 310. FIG. 4 illustrates information regarding the volume A stored in the storage system A of the base A.

A directory 312 stores information of the volume A stored in the storage system A installed in the base A. A directory 313 under the directory 312 stores the bitmap of the snapshot of volume A. The object name of each bitmap indicates a base name, a storage system number, a volume number, a snapshot name, the time of the snapshot, and the volume size.

For example, the object name of "management file 00" is "siteA_deviceA_volA_snapshot00_202401101200_10TB.bitmap". This indicates that this is a bitmap of the snapshot 00 of the volume A stored in the storage system A installed in the base A. Further, it indicates that the snapshot creation time is 12:00 on Jan. 10, 2024 and the volume size is 10 TB.

A directory 314 immediately below the directory 312 stores a snapshot (snapshot data) of the volume A. Here, a snapshot of the third generation is stored, and each snapshot is divided into two parts. The data structure of the snapshot of each generation is freely set. The object name of the snapshot indicates a base name, a storage system number, a volume number, a snapshot name, a time of the snapshot, and a corresponding area of the volume.

For example, the object name of "Snapshot00 Data1" is "siteA_deviceA_volA_snapshot00_202401101200_0-5TB". This indicates that this is data of the snapshot 00 of the volume A stored in the storage system A installed in the base A. Further, it indicates that the snapshot creation time is 12:00 on Jan. 10, 2024 and the corresponding volume area is 0-5 TB.

A directory 315 immediately below the directory 312 stores a backup catalog. The object name thereof bitmap indicates a base name, a storage system number, a volume number, a snapshot name, the time of the snapshot, and the volume size. "SiteA_deviceA_volA_20240121000_10TB.catalog" illustrated in FIG. 4 is a backup catalog of the volume A stored in the storage system A installed in the base A, and indicates that the generation time is Jan. 21, 2024 at 0:00 and the volume size is 10 TB.

FIG. 5 illustrates an example of the backup catalog 320 of the volume A. The backup catalog 320 represents information of the snapshot of the volume A in a format that can be searched by the cloud storage system 310. In the example illustrated in FIG. 5, the backup catalog 320 indicates an identifier (generation) of each snapshot, a backup time (snapshot generation time), and a volume size of a copy source. The backup catalog 320 generated from the object name of the bitmap manages the backup data with low cost and high extensibility, and realizes high-speed restoration.

Figure 6:
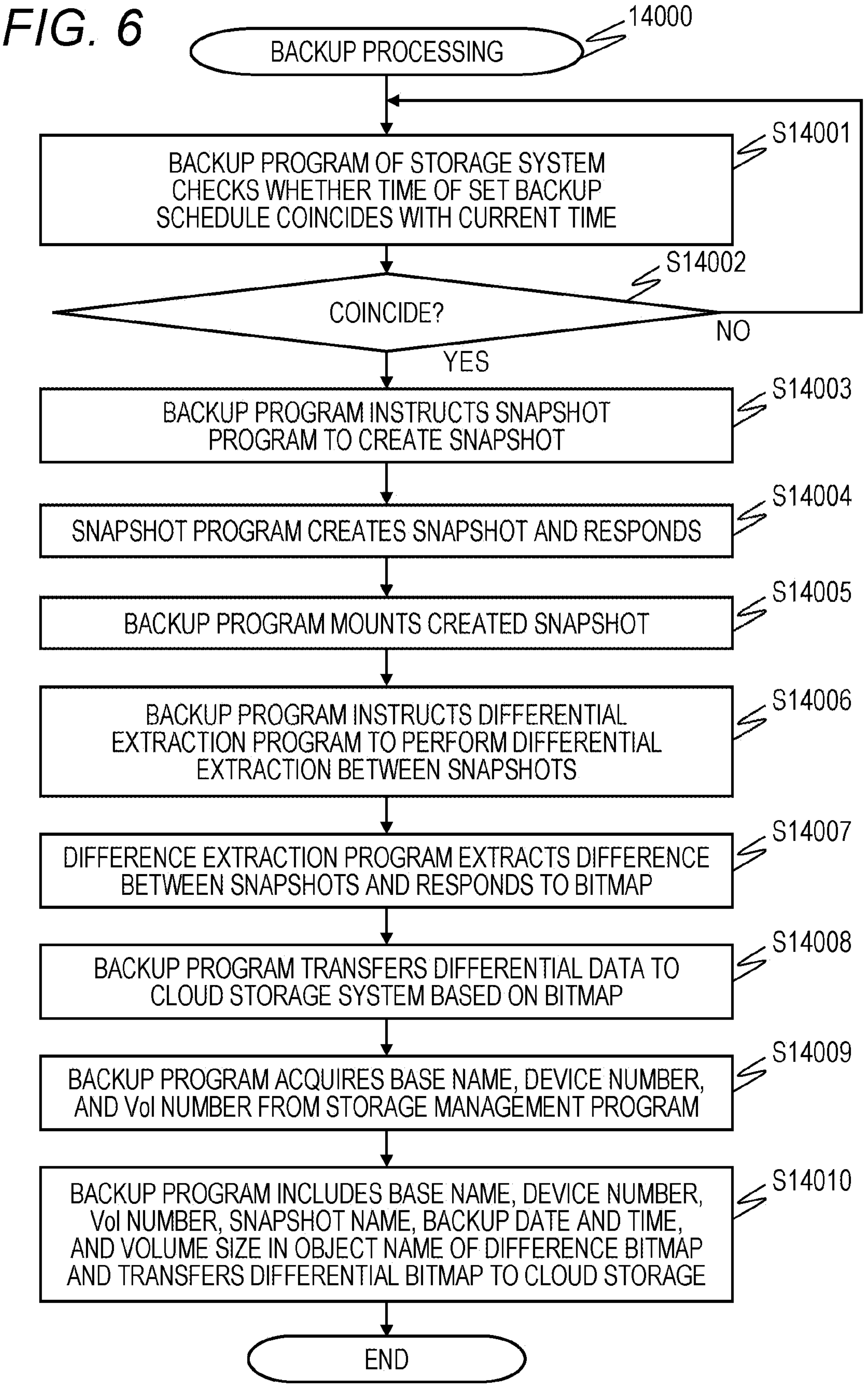
FIG. 6 illustrates an example of a flowchart of backup processing.

Next, processing of the computer system will be described. FIG. 6 illustrates an example of a flowchart of backup processing 14000.

The backup program 212 of the storage system 210 checks whether the time of the set backup schedule coincides with the current time (S14001). In a case where the time does not coincide with the current time (S14002: NO), the flow returns to Step S14001. In a case where the time coincides with the current time (S14002: YES), the backup program 212 instructs the snapshot program 211 of the storage system 310 to create a snapshot (S14003).

The snapshot program 211 creates a snapshot of the designated volume and returns a response (S14004). The backup program 212 mounts the created snapshot (S14005).

Then, the backup program 212 instructs the differential extraction program 216 to execute differential extraction between snapshots (S14006). The differential extraction program 216 extracts a difference between snapshots and responds with a bitmap (difference bitmap) (S14007). The backup program 212 transfers differential data to the cloud storage system 310 based on the bitmap (S14008). Specifically, the backup program 212 reads differential block data from the mounted snapshot, converts the differential block data into a file format, and transmits the conversion result to the cloud storage system 310.

The backup program 212 acquires the base name of the snapshot, the storage system number (serial number), and the volume number from the storage management program 215 (S14009). These items are included in the object name of the snapshot. The backup program 212 includes the base name, the serial number, the volume number, the snapshot name, the backup date and time, and the volume size in the object name of the bitmap, and transfers the bitmap to the cloud storage system 310 (S14010). As described above, the information of the copy source is included in the object name of the bitmap. As a result, it is possible to easily generate the backup catalog for search.

Figure 7:
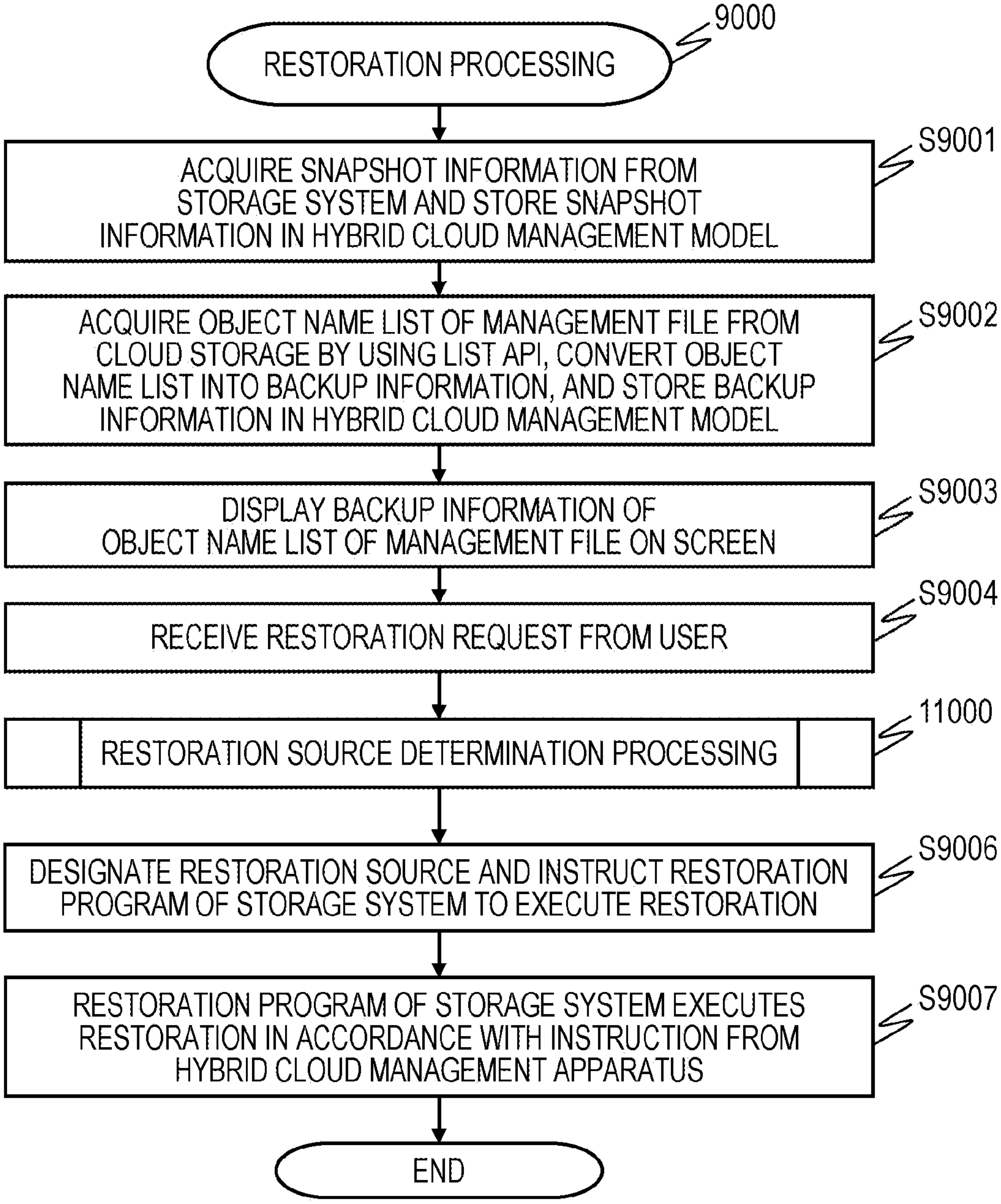
FIG. 7 illustrates an example of a flowchart of an aspect of restoration processing.

Restoration processing of some aspects will be described below. In restoration processing 9000 illustrated in FIG. 7, the hybrid cloud management apparatus 10 displays all backup catalogs. A display device may be included in a user terminal connected to the hybrid cloud management apparatus 10. In this restoration processing, the search of the backup catalog is omitted. For example, the restoration processing is executed according to a user instruction.

The restoration setting program 113 acquires the snapshot information from the storage system 210 and stores the snapshot information in the LocalSS information of the hybrid cloud management model 114 (S9001). The restoration setting program 113 acquires an object name list of a management file (bitmap) from the cloud storage system 310 by using the LIST API, converts the object name list into backup information, and stores the backup information in RemoteSS information of the hybrid cloud management model 114 (S9002).

The restoration setting program 113 displays the backup information of the object name list of the management file on a screen (S9003). The displayed object name may be, for example, information regarding all volumes in all bases. The displayed backup information can include information of a backup time and a volume size in addition to information identifying a base, a storage system, a volume, and a snapshot. Some of these items may be omitted.

The restoration setting program 113 receives a restoration request from the user (S9004). The restoration request designates a snapshot of a volume to be restored and a storage system of a restoration destination.

Then, the restoration setting program 113 executes restoration source determination processing (11000). The restoration source determination processing refers to the LocalSS information and the RemoteSS information, and determines the restoration source for each generation. Details will be described later.

Then, the restoration setting program 113 designates a restoration source and instructs the restoration program 213 of the storage system 210 to execute restoration (S9006). The restoration program 213 of the storage system 210 executes restoration in accordance with an instruction from the hybrid cloud management apparatus 10 (S9007).

Figure 8:
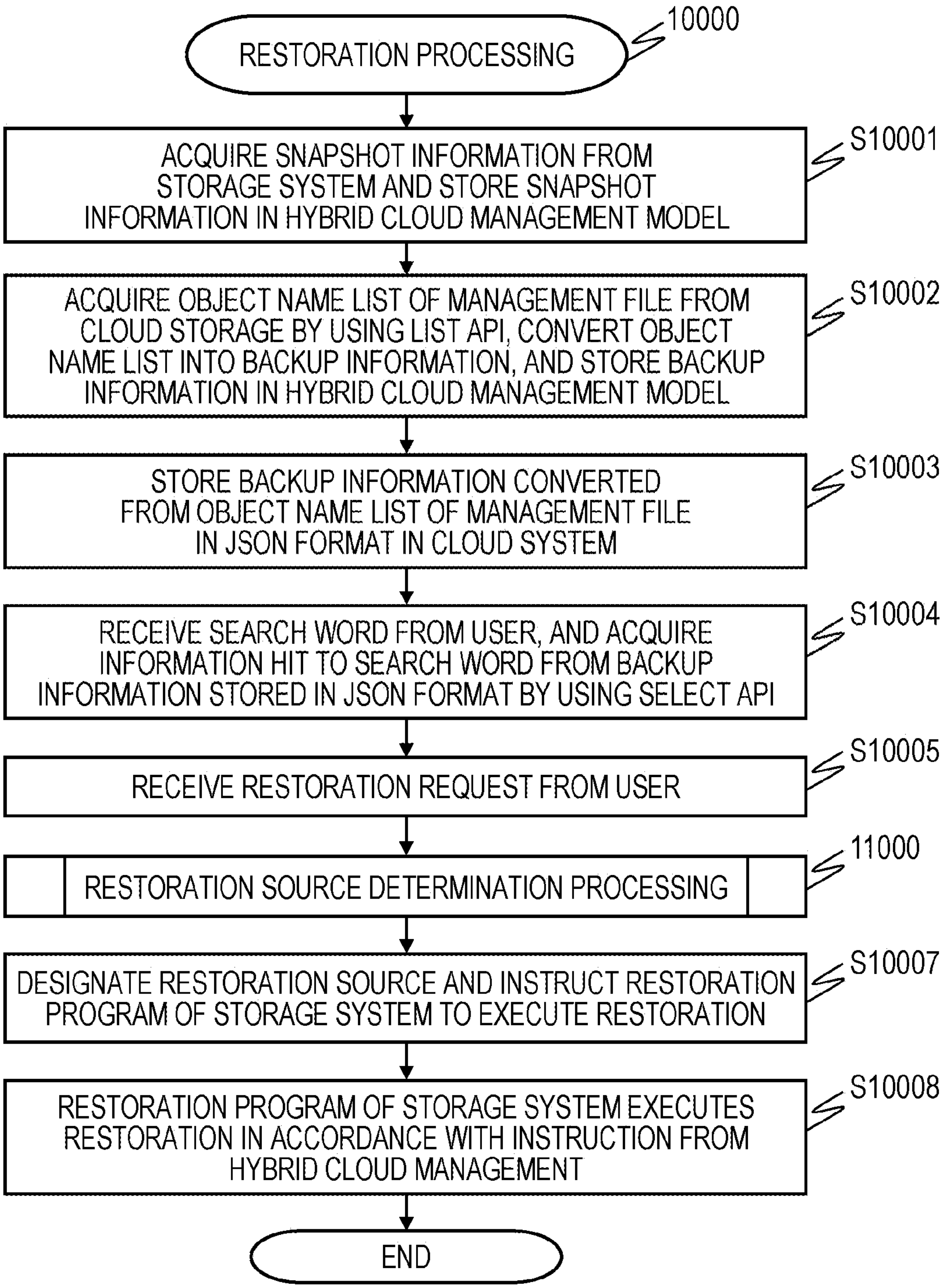
FIG. 8 illustrates an example of a flowchart of another aspect of the restoration processing.

Next, the restoration processing according to another aspect will be described with reference to FIG. 8. A restoration processing 10000 illustrated in FIG. 8 enables the user to search for backup information using a selection command (Select) of the cloud storage system 310.

The restoration setting program 113 acquires the snapshot information from the storage system 210 and stores the snapshot information in the LocalSS information of the hybrid cloud management model 114 (S10001). The restoration setting program 113 acquires an object name list of a management file (bitmap) from the cloud storage system 310 by using the LIST API, converts the object name list into backup information, and stores the backup information in RemoteSS information of the hybrid cloud management model 114 (S10002).

The restoration setting program 113 includes the backup information converted from the object name list of the management file (bitmap) in the backup catalog 320 in a specific format, for example, a JSON format, and stores the backup information in the cloud storage system 310. The backup information included in the backup catalog 320 may be, for example, information regarding all volumes in all bases.

The restoration setting program 113 receives a search word from the user, and acquires information that hits the search word from the backup information (the backup catalog 320) stored in the JSON format by using the SELECT API (S10004). The search word indicates, for example, information regarding the volume of the restoration source, and may designate, for example, the volume of the restoration target and the time thereof.

The restoration setting program 113 receives a restoration request from the user (S10005). The restoration request designates a snapshot of a volume to be restored and a storage system of a restoration destination. The user can easily create the restoration request according to the search result.

Then, the restoration setting program 113 executes restoration source determination processing (11000). The restoration source determination processing refers to the LocalSS information and the RemoteSS information, and determines the restoration source for each generation. Details will be described later.

Then, the restoration setting program 113 designates a restoration source and instructs the restoration program 213 of the storage system 210 to execute restoration (S10007). The restoration program 213 of the storage system 210 executes restoration in accordance with an instruction from the hybrid cloud management apparatus 10 (S10008).

Figure 9:
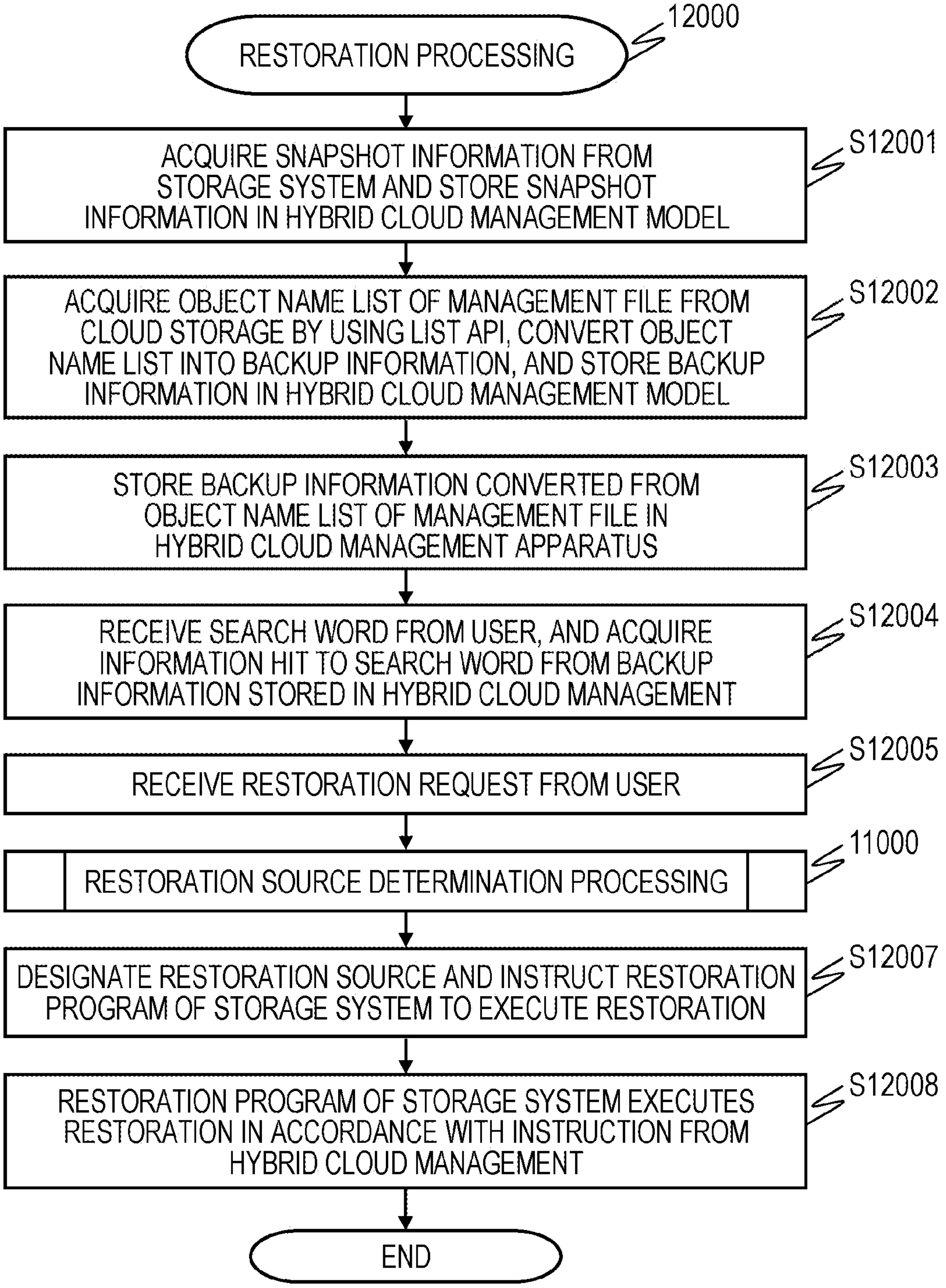
FIG. 9 illustrates an example of a flowchart of still another aspect of the restoration processing.

Next, the restoration processing according to another aspect will be described with reference to FIG. 9. In restoration processing 12000 illustrated in FIG. 9, the hybrid cloud management apparatus 10 searches for the backup information.

The restoration setting program 113 acquires the snapshot information from the storage system 210 and stores the snapshot information in the LocalSS information of the hybrid cloud management model 114 (S12001). The restoration setting program 113 acquires an object name list of a management file (bitmap) from the cloud storage system 310 by using the LIST API, converts the object name list into backup information, and stores the backup information in RemoteSS information of the hybrid cloud management model 114 (S12002).

The restoration setting program 113 stores the backup information converted from the object name list of the management file (bitmap) in the hybrid cloud management apparatus 10. The file format is freely set, and may be a text format or a more complex database. The backup information may be, for example, information regarding all volumes in all bases.

The restoration setting program 113 receives the search word from the user, and acquires information that hits the search word from the backup information stored in the hybrid cloud management apparatus 10 (S12004). The search word indicates, for example, information regarding the volume of the restoration source, and may designate, for example, the volume of the restoration target and the time thereof.

The restoration setting program 113 receives a restoration request from the user (S12005). The restoration request designates a snapshot of a volume to be restored and a storage system of a restoration destination. The user can easily create the restoration request according to the search result.

Then, the restoration setting program 113 executes restoration source determination processing (11000). The restoration source determination processing refers to the LocalSS information and the RemoteSS information, and determines the restoration source for each generation. Details will be described later.

Then, the restoration setting program 113 designates a restoration source and instructs the restoration program 213 of the storage system 210 to execute restoration (S12007). The restoration program 213 of the storage system 210 executes restoration in accordance with an instruction from the hybrid cloud management apparatus 10 (S12008).

Figure 10:
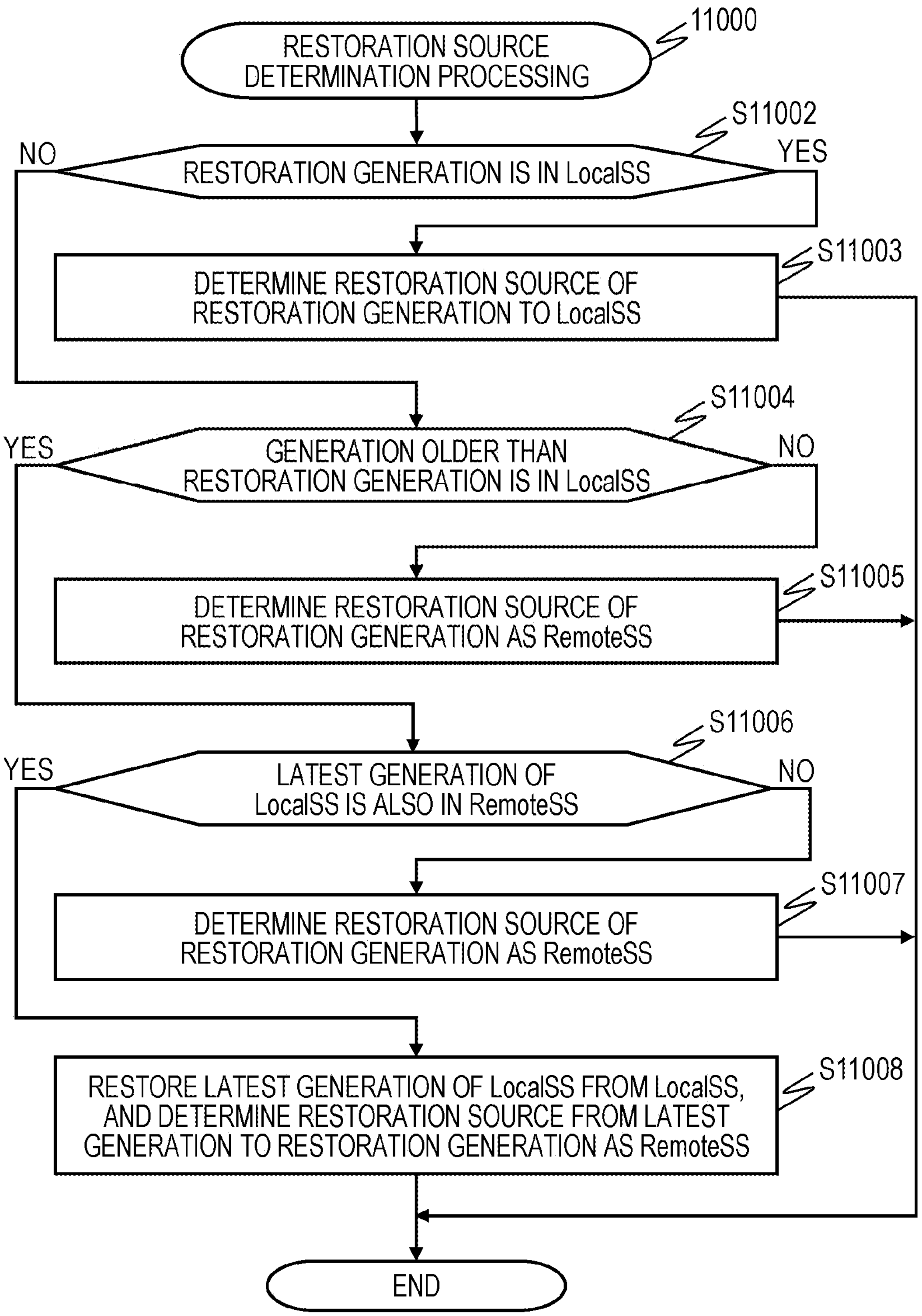
FIG. 10 illustrates an example of a flowchart of restoration source determination processing.

Next, restoration source determination processing 11000 will be described. FIG. 10 illustrates an example of a flowchart of the restoration source determination processing 11000. The restoration source determination processing 11000 refers to the LocalSS information and the RemoteSS information, and determines the restoration source for each generation.

The restoration setting program 113 determines whether all pieces of data for restoring the volume generation (restoration generation) designated by the user are stored in LocalSS (restoration destination storage system 210) (S11002).

For example, in a case where the storage system 210 stores data of a snapshot of a designated generation and all snapshots older than the designated generation, the determination result is "YES". Each snapshot stored in the storage system 210 or the cloud storage system 310 may be data obtained by merging consecutive snapshots of an older generation or all pieces of data of this generation (no difference). Unnecessary old generation snapshots may be discarded.

In a case where all pieces of the data for restoring the volume generation designated by the user is stored in LocalSS (S11002: YES), the restoration setting program 113 determines the local storage system 210 as the restoration source (S11003).

In a case where the data for restoring the volume generation designated by the user is insufficient (S11002: NO), the restoration setting program 113 determines whether data for restoring data of a generation older than the designated generation exists in LocalSS (S11004). For example, in a case where only data of a generation newer than the designated generation exists in LocalSS, the determination result of Step S11004 is NO.

In a case where the data does not exist in LocalSS (S11004: NO), the restoration setting program 113 determines the restoration source as RemoteSS, that is, the cloud storage system 310 (S11005). That is, the volume data is restored only from the snapshot data backed up in the cloud storage system 310.

In a case where data for restoring data of a generation older than the designated generation exists in LocalSS (S11004: YES), the restoration setting program 113 determines whether the latest generation of LocalSS also exists in RemoteSS (S11006).

In a case where the generation does not exist in RemoteSS (S11006: NO), the restoration setting program 113 determines the restoration source as RemoteSS, that is, the cloud storage system 310 (S11007). That is, in a case where the latest generation of LocalSS is older than the designated generation and is older than the oldest generation of RemoteSS, the restoration source is determined to be RemoteSS. As a result, in a case where the snapshot of LocalSS is too old, it is possible to appropriately execute restoration from RemoteSS.

In a case where the latest generation of LocalSS also exists in RemoteSS (S11006: YES), the restoration setting program 113 restores the latest generation of LocalSS from LocalSS, and determines the restoration source from the newer generation to the restoration generation as RemoteSS (S11008). As a result, it is possible to reduce the data transfer amount of from the cloud storage system 310.

The present invention is not limited to the above embodiments, and various modification examples may be provided. For example, the above embodiments are described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

Some or all of the configurations, the functions, the processing units, and the like described above may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and a solid state drive (SSD), or a recording medium such as an IC card, and an SD card.

Control lines and information lines considered necessary for the descriptions are illustrated, and not all the control lines and the information lines in the product are necessarily shown. In practice, it may be considered that almost all components are connected to each other.

What is claimed is:

1. An apparatus that manages a storage system, the apparatus comprising:

a processor; and a storage device that stores a backup management model, wherein the backup management model includes:

information of a snapshot generation of a volume, which is stored in a restoration destination storage system, and information of the snapshot generation of the volume, which is stored in a cloud storage system, and wherein the processor is configured to select a restoration source of each of the snapshot generations to be used for restoration of a generation designated in the restoration destination storage system from the restoration destination storage system and the cloud storage system with reference to the backup management model, wherein, in a case where the restoration destination storage system stores a snapshot of a generation older than the designated generation, and the cloud storage system stores a snapshot of a latest generation stored in the restoration destination storage system, the processor determines a restoration source up to the latest generation as the restoration destination storage system, and determines a restoration source up to the designated generation after the latest generation as the cloud storage system, and the processor restores the volume to the designated generation using snapshots from the determined restoration sources.

2. The apparatus according to claim 1, wherein, in a case where the restoration destination storage system stores all snapshots for restoring the designated generation, the processor determines a restoration source of snapshots of all generations as the restoration destination storage system.

3. The apparatus according to claim 1, wherein, in a case where the restoration destination storage system does not store a snapshot of the designated generation or an older generation, the processor determines a restoration source of snapshots of all generations as the cloud storage system.

4. The apparatus according to claim 1, wherein the processor acquires, from the cloud storage system, backup information including information of a snapshot stored in the cloud storage system, and generates, from the backup information, a backup catalog in a format searchable by the cloud storage system, the backup catalog including information of a snapshot designated by a user.

5. The apparatus according to claim 4, wherein the backup information includes a list of object names of a bitmap of the snapshot stored in the cloud storage system, and the object name includes information of the snapshot.

6. The apparatus according to claim 5, wherein the processor stores the backup catalog in the cloud storage system, the backup catalog has a format corresponding to a search command of the cloud storage system, and the processor is further configured to:

transmit a search command to the cloud storage system together with a search word designated by the user; and receive a search result from the cloud storage system.

7. The apparatus according to claim 1, wherein, in a case where the restoration destination storage system stores all snapshots for restoring the designated generation, the processor determines a restoration source of snapshots of all generations as the restoration destination storage system.

8. The apparatus according to claim 1, wherein, in a case where the restoration destination storage system does not store a snapshot of the designated generation or an older generation, the processor determines a restoration source of snapshots of all generations as the cloud storage system.

9. The apparatus according to claim 1, wherein the processor acquires, from the cloud storage system, backup information including information of a snapshot stored in the cloud storage system, and generates, from the backup information, a backup catalog in a format searchable by the cloud storage system, the backup catalog including information of a snapshot designated by a user.

10. The apparatus according to claim 9, wherein the backup information includes a list of object names of a bitmap of the snapshot stored in the cloud storage system, and the object name includes information of the snapshot.

11. The apparatus according to claim 10, wherein the processor stores the backup catalog in the cloud storage system, the backup catalog has a format corresponding to a search command of the cloud storage system, and the processor is further configured to: transmit a search command to the cloud storage system together with a search word designated by the user;

and receive a search result from the cloud storage system.

12. The apparatus according to claim 1, wherein the restoration destination storage system is an on-premises storage system.

13. The apparatus according to claim 1, wherein the backup management model further includes information identifying a parent-child relationship between snapshot generations.

14. The apparatus according to claim 1, wherein the processor transfers snapshot data from the cloud storage system to the restoration destination storage system for the snapshot generations determined to have the cloud storage system as the restoration source.

15. The apparatus according to claim 1, wherein the processor applies snapshots from the restoration destination storage system before applying snapshots from the cloud storage system when restoring the volume to the designated generation.

16. The apparatus according to claim 1, wherein the backup management model is stored in the storage device of the apparatus and is updated when snapshots are created or deleted in the restoration destination storage system or the cloud storage system.

17. The apparatus according to claim 1, wherein the processor compares the snapshot generation information stored in the restoration destination storage system with the snapshot generation information stored in the cloud storage system to select the restoration source for each snapshot generation.

18. An apparatus that manages a storage system, the apparatus comprising:

a processor; and a storage device that stores a backup management model, wherein the backup management model includes:

information of a snapshot generation of a volume, which is stored in a restoration destination storage system, and information of the snapshot generation of the volume, which is stored in a cloud storage system, and wherein the processor is configured to select a restoration source of each of the snapshot generations to be used for restoration of a generation designated in the restoration destination storage system from the restoration destination storage system and the cloud storage system with reference to the backup management model, wherein, in a case where a latest generation of a snapshot of the volume stored in the restoration destination storage system is older than the designated generation and is older than an oldest generation of a snapshot of the volume stored in the cloud storage system, the processor determines a restoration source of snapshots of all generations as the cloud storage system, and the processor restores the volume to the designated generation using snapshots from the cloud storage system.

19. A method in which an apparatus manages a storage system, wherein the apparatus stores a backup management model, and the backup management model includes:

information of a snapshot generation of a volume, which is stored in a restoration destination storage system, and information of a snapshot generation of the volume, which is stored in a cloud storage system, the method comprising, by the apparatus, selecting a restoration source of each of the snapshot generations to be used for restoration of a generation designated in the restoration destination storage system from the restoration destination storage system and the cloud storage system with reference to the backup management model, wherein, in a case where the restoration destination storage system stores a snapshot of a generation older than the designated generation, and the cloud storage system stores a snapshot of a latest generation stored in the restoration destination storage system, the apparatus determines a restoration source up to the latest generation as the restoration destination storage system, and determines a restoration source up to the designated generation after the latest generation as the cloud storage system, and the apparatus restores the volume to the designated generation using snapshots from the determined restoration sources.

20. A method in which an apparatus manages a storage system, wherein the apparatus stores a backup management model, and the backup management model includes:

information of a snapshot generation of a volume, which is stored in a restoration destination storage system, and information of a snapshot generation of the volume, which is stored in a cloud storage system, the method comprising, by the apparatus, selecting a restoration source of each of the snapshot generations to be used for restoration of a generation designated in the restoration destination storage system from the restoration destination storage system and the cloud storage system with reference to the backup management model, wherein, in a case where a latest generation of a snapshot of the volume stored in the restoration destination storage system is older than the designated generation and is older than an oldest generation of a snapshot of the volume stored in the cloud storage system, the apparatus determines a restoration source of snapshots of all generations as the cloud storage system, and the apparatus restores the volume to the designated generation using snapshots from the cloud storage system.

* * * * *